United States Patent [19]
Brown

[11] Patent Number: 5,088,246
[45] Date of Patent: Feb. 18, 1992

[54] ACCESS BOX FOR CONDUITS

[76] Inventor: Noel S. Brown, 10 Hopson Rd., Jacksonville Beach, Fla. 32250

[21] Appl. No.: 507,598

[22] Filed: Apr. 10, 1990

[51] Int. Cl.⁵ .............................................. H02G 3/08
[52] U.S. Cl. .................................... 52/127.8; 52/221; 174/48
[58] Field of Search ...................... 52/220, 221, 127.1, 52/127.7, 127.8, 577; 174/48, 49, 50, 66

[56] References Cited

U.S. PATENT DOCUMENTS

| | | | |
|---|---|---|---|
| Re. 28,756 | 4/1976 | Fork | 52/221 X |
| 1,229,576 | 6/1917 | Boyton | 52/221 X |
| 1,824,571 | 9/1931 | Richardson | 52/221 |
| 3,823,251 | 7/1974 | Heithecker et al. | 52/221 X |
| 3,851,674 | 12/1974 | Fork | 52/221 X |
| 3,909,912 | 10/1975 | Kiesling | 52/221 X |
| 3,943,272 | 3/1976 | Carroll et al. | 52/221 X |
| 4,638,115 | 1/1987 | Benscoter | 174/48 |
| 4,841,699 | 6/1989 | Wilson et al. | 52/221 |

*Primary Examiner*—John E. Murtagh
*Attorney, Agent, or Firm*—Thomas C. Saitta

[57] ABSTRACT

An service line conduit access box for forming a void in a poured concrete slab comprising a body portion and lid, the body portion having a seating flange and an outwardly angled seating rim, the lid having a bottom sized to fit over the seating flange and an outwardly angled lid rim abutting the seating rim. The lid is adapted to receive a concrete layer and has a pry lip for removal of the lid and a plateau for excluding concrete from a portion of the lid. The access box is set in place prior to pouring the concrete slab and the conduits are connected to its sides. The floor is then poured and allowed to harden. The lid is removed and the service lines are pulled through. The lid is then replaced with the lines extending through a hole cut in the plateau.

10 Claims, 1 Drawing Sheet

ACCESS BOX FOR CONDUITS

BACKGROUND OF THE INVENTION

The invention relates generally to the field of devices used to form voids in concrete or cement floor slabs, and more particularly to such devices which provide access to the conduits after the slab has been poured. Such devices are set in place at a desired location and connected to conduits to allow various service lines, such as refrigeration, plumbing, and electrical lines, to be pulled through the slab and connected to units above the slab. The device is an access box having a lid which both forms a closed void within the access box and acts as a form to retain some of the concrete, so that the concrete slab can be poured around the device and into the lid at the same time. After the concrete has set, the lid can be pried up to provide access to the void, the lid remaining undamaged so that it can be replaced onto the access box.

Modern construction techniques often use a poured concrete slab for the floor of a structure. In the case of buildings having large open areas, such as a grocery store, it is usually necessary to extend electrical, plumbing, refrigeration or other such service lines to locations in the central areas away from the outer walls. The conduits for these service lines are placed below or within the concrete slab so that the lines are not exposed and in the way, with access ports being situated at the desired locations for the lines to emerge from the floor for connection to the individual machines, refrigerators, etc. In practice, the conduits are laid out on site prior to pouring the concrete floor, running from the edge of the slab or service origin points to numerous access boxes, commonly called pull boxes, situated at the required locations. The floor is then poured and allowed to set, and then the various lines are pulled through the embedded conduits and up through the voids formed by the access boxes to extend out of the floor.

The standard practice for making the access boxes is to build a four sided, bottomless wooden form, the height of the walls being sufficient to extend above the top level of the concrete to be poured. The ends of the conduits, for example, PVC pipes, abut the outside of the sides of the wooden form. After construction of the wooden boxes, the floor is poured with the concrete covering the conduits and surrounding the wooden form. After the concrete hardens, the wooden form must be removed by breaking it out of the concrete slab, since it will deteriorate over time and destroy the integrity of the floor. A concrete bottom is then poured in the void left by removal of the wooden form. The service lines are then pulled through the conduits to extend above the top surface of the floor, and the access void is filled with sand to a height several inches below the slab surface. A top layer of concrete is then poured onto the sand to seal off the access void.

In construction of grocery stores and the like, building and health codes require that the floor be solid and continuous, with no openings to allow ingress of water, air, insects, etc. The floor must have a minimum two inch depth of poured concrete. It is this requirement that dictates the steps of removing the wooden form, pouring a bottom and then pouring a top, so that the resulting floor will be the minimum two inches in thickness above the void and will have a solid, continuous surface. It is often necessary at a later date to gain access to repair the line joints contained within the access void, and with the standard method, the floor must be torn up with jack hammers or the like to remove the top layer and the sand must be taken out. After the problem is corrected, the sand must be replaced and new concrete must then be poured to form a new top layer.

A pre-formed access box, capable of remaining within the slab, has been created to provide a permanent void in the concrete slab The access box is merely set into place, so no form construction is required. The access box has a removable lid which contains the two inch top concrete layer and which is simply pried up and then placed back in position after problems with the line joints have been corrected. The lid has a raised portion to exclude concrete from the area through which the service lines will ultimately extend. The access box enables the top to be poured at the same time as the surrounding floor, thus eliminating the steps of pouring a bottom and then a top to seal the void at a time after the floor itself has been poured, with the corresponding savings in construction time.

It is an object of the invention to provide a pre-formed access box which eliminates a number of steps now required in the construction of access voids in poured concrete slabs, in particular allowing the top layer to be poured at the same time as the surrounding floor.

It is a further object to provide such an access box which has a removable and replaceable lid which contains the top layer of concrete.

It is a further object to provide such an access box where the lid has a raised portion to exclude concrete from the region through which the service lines will be extended.

It is a further object to provide such an access box where the lid seating rim of the main body and the perimeter of the lid itself are flared to allow the lid to be pried from the main body of the access box.

It is a further object to provide such an access box where a portion of the flared lid perimeter and flared lid seating rim are angled greater than the angle of the flaring to provide a pry lip.

BRIEF SUMMARY OF THE INVENTION

The invention comprises a pre-formed access box and its method of use. The access box is preferably formed out of fiberglass or similar polymeric material, so that it can be easily ground down in final finishing steps if necessary. The box has substantially vertical side walls and a bottom. The top section of the walls have an outwardly extending seating flange relatively perpendicular to the walls themselves. A seating rim extends upward from the seating flange and is flared outward at an angle. A lid having a relatively planar bottom with dimensions matching the dimensions of the seating flange and having an outwardly flaring rim matching the angle of the flared portion of the walls completely covers the box and seats within the flared portion of the walls on the seating flange, such that a completely closed central void is created. The lid is substantially concave when viewed from the outside, the flared rim acting as a form to receive and retain concrete poured into it. A small section of the flared rim and flared wall portion is offset at an even greater angle from the vertical walls to form a pry lip. A portion of the interior of the lid, preferably adjacent to the flared rim, is raised to exclude concrete from that area during the pouring operation. This creates an area of extremely thin concrete or no concrete at all, and this area will be cut during installation of the service lines to provide exit means for the service lines from the interior of the access box. The lid may also have one or more troughs extending toward the interior of the access box to provide a thicker section of concrete for reinforcement purposes. Further, the walls may have annular shoulders of substantially right angle configuration located adjacent to the seating flange to provide additional structural support to the access box.

The method of the invention involves the steps of setting the pre-formed access box at the desired location and at the required height. The conduits are then connected through the side walls of the access box and the lid is put in place. The concrete is then poured to form the floor slab, with the concrete being poured preferably first into the lid to prevent the access box from floating out of the concrete. The box is preferably set to be from one-eighth to one-quarter inches below the final upper surface of the poured concrete, so that when the concrete hardens there will be a small crack line around the perimeter at the lid and box joint line. If the floor is not level, the concrete and box can be abraded using standard procedures. Since the void is covered and the slab is of sufficient thickness, normal construction operations including operation of heavy equipment can be performed over the entire slab without having to avoid the access box area. In the final set-up stages, the lid is pried out, the service lines are pulled through the conduits, and the lid is cut at the raised portion to create an opening for the lines to extend upward from the floor. The lid is then slid back into place, and final floor covering operations (installation of tile, terrazzo, linoleum, carpet, etc.) are performed and the store equipment put into place and connected to the service lines. If access to the service line joints is needed at a later date, the floor surface covering is removed, the lid is simply pried up, the repairs are made, the lid is replaced and the floor covering reapplied.

Figure 1:
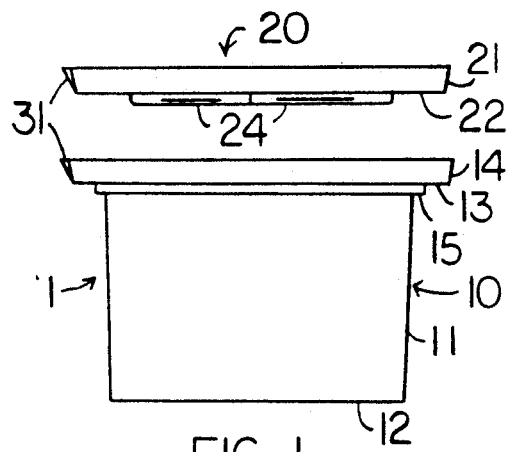
FIG. 1 is a side view of the invention, with the lid shown as separated from the main body for clarity.
Figure 2:
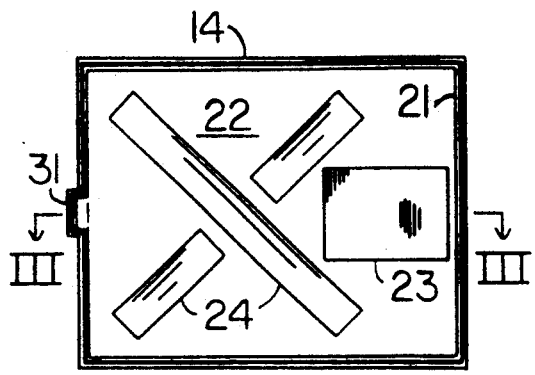
FIG. 2 is a top view of the invention showing the lid seated in the main body of the box.
Figure 3:
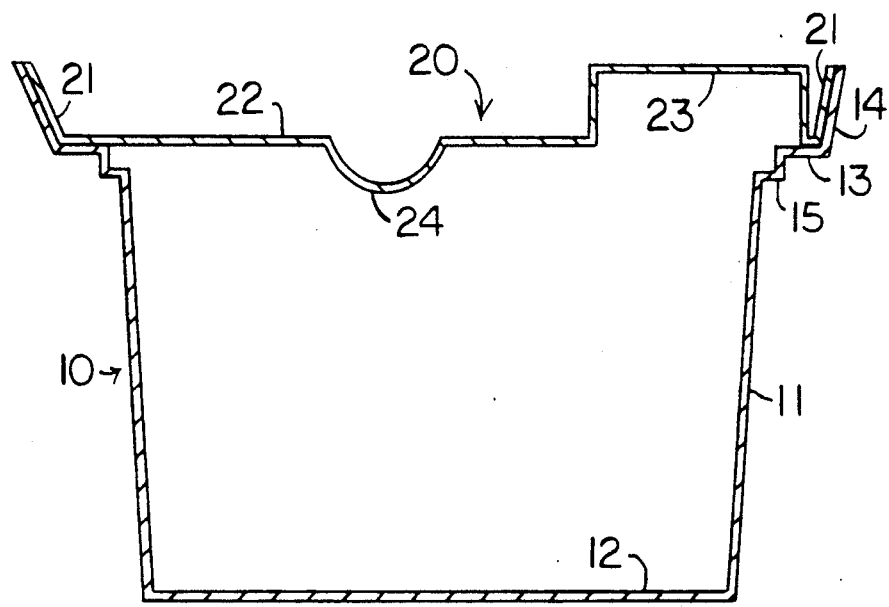
FIG. 3 is a cross-sectional view taken along line III—III of FIG. 2.
Figure 4:
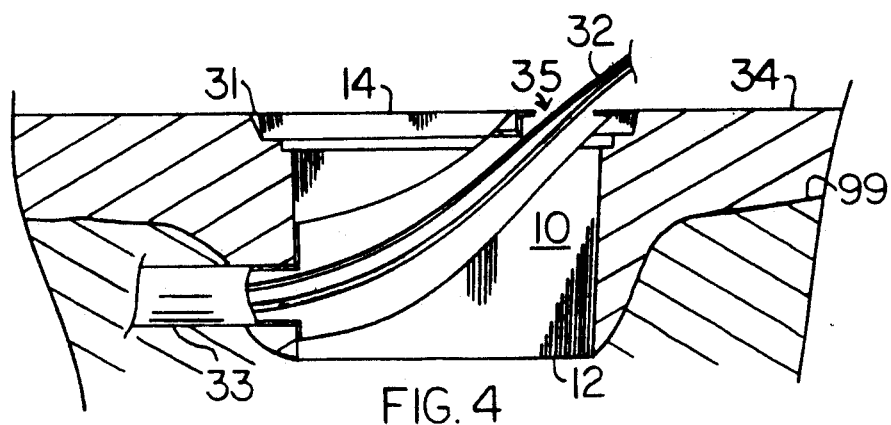

4 is an exposed sectional view showing the access box situated within the concrete slab, with the conduits and service lines in place.

DETAILED DESCRIPTION OF THE INVENTION

With reference to the figures, the invention is an access box 1 shown to comprise a main body 10 and a lid 20. The main body 10 has a bottom 12 and substantially vertical side walls 11. The cross-sectional configuration can be square, as illustrated, or can be rectangular, circular, oval or any other shape, provided the bottom 12 and side walls combine to form a defined inner void. The side walls 11 may be tapered so that the bottom perimeter is slightly smaller than the upper perimeter to allow plural main bodies 1 0 to be nested for storage or transportation. A seating flange 13 extends substantially horizontally outward from the top portion of the side walls 11, and encompasses the entire perimeter. Extending upward at a slight angle from the outer edge of seating flange 13 is a flared seating rim 14.

Seating rim 14 also extends around the entire perimeter to form a continuous and uninterrupted barrier. Preferably, annular shoulder 15 adjoins seating flange 13 to side walls 11. Annular shoulder 15 is constructed to have a short, substantially horizontal flange extending outward from the top of side walls 11 and a short, substantially vertical flange extending upward from the outer edge of the horizontal flange to meet the inner edge of seating flange 13, such that annular shoulder 15 is substantially of right angle configuration. Annular shoulder 15, while not required, adds additional structural strength in the vertical direction.

Lid 20 is shaped and sized to correspond to the particular shape and size of main body 10. Lid 20 has a relatively planar bottom 22 with dimensions matching the outer dimensions of seating flange 13, such that a portion of lid bottom 22 rests on and completely covers seating flange 13, the combination of lid 20 and main body 10 thus forming a closed void within the interior. Extending upward from the outer edge of lid bottom 22 is lid rim 21. Lid rim 21 extends around the full perimeter, and is flared to match the angle of seating rim 14. Thus when lid 20 is seated on seating flange 13 of main body 10, lid rim 21 will be directly abutting seating rim 14. In this manner, lid 20 securely nests within the upper portion of main body 10, the matched dimensions requiring removal of lid 20 in the vertical direction only with no lateral movement allowable. Preferably, an excluding plateau 23 is formed over a portion of lid bottom 22, either directly adjacent or relatively near a portion of the lid rim 21. This plateau 23 has a relatively planar upper surface, substantially parallel to lid bottom 21. The height of plateau 23 is substantially the same as that of lid rim 21. Plateau 23 acts to exclude concrete 34 from that area of lid bottom 22, creating an area which can be easily cut or drilled at a later time to create an aperture 35 for extending the service lines 32 from the access box 1. Furthermore, lid 20 preferably contains one or more troughs 24 which extend toward the interior of the access box 1. Troughs 24 act as reinforcement ribs when filled with concrete 34, increasing the strength of the concrete layer in lid 20.

A small segment of lid rim 21 and seating rim 14 is extended outward at an angle even greater than the angle of lid rim 21 and seating rim 14 to form a pry lip 31, preferably located in the center of one of the side walls 11. Since lid 20 seats tightly within seating rim 14 and on seating flange 13, and will contain several inches of concrete 34, it is necessary to force lid 20 in a relatively vertical direction to remove it. Pry lip 31, by virtue of being angled a greater number of degrees from vertical than lid rim 21 and seating rim 14, provides a means of leveraging lid 20 off of main body 10 by insertion of a screwdriver or other thin pry bar in the pry lip 31 between lid rim 21 and seating rim 14 and application of downward leverage on the screwdriver.

Access box 1 is preferably made of a polymeric or resin material containing reinforcing glass fibers, but could be made of metal or other suitably rigid material Construction from the preferred type of material allows grinding of the access box 1 if it is necessary to remove a portion of the hardened concrete to level the poured concrete slab. The height of lid rim 21 and seating rim 14, as well as plateau 23, should be at least two inches to allow for a two inch layer of concrete 34 over the internal void. Preferably, the angle of lid rim 21 and seating rim 14 should be approximately 10 degrees out of vertical, with the angle of pry lip 31 being approximately 25 degrees out of vertical. Of course, the actual angles can vary over a large range, provided that the angle of the pry lip 31 is sufficient to provide the necessary leverage angle and the angles of both the lid rim 21 and seating rim 14 are essentially the same. The depth of troughs 24 can be roughly one inch. A typical access box 1 may have wall thicknesses of approximately one sixteenth of an inch and may be anywhere from 19 to 64 inches in width or length and anywhere from 12 to 24 inches in height, but of course other sizes are possible without deviating from the scope of the invention.

The method of the invention comprises the steps of providing an access box 1 as described above to be positioned at a desired location within the floor area. The box 1 is positioned either directly on the prepared earth surface 99, on a preformed concrete pad or on metal stakes. The box 1 is leveled so that the upper edges of the lid rim 21 and seating rim 14 are even with or, preferably, from one-eighth to one-quarter inches below the eventual final upper surface of the poured concrete 34. Holes are then cut into the side walls 11 for connection of conduits 33. The connections are sealed to prevent ingress of the poured concrete 34 into the internal void. The access box 1 is usually much deeper than the depth of the slab, so space is left between the earth 99 and the side walls 11 to allow concrete to flow around and surround the box 1. The lid 20 is now put in place, closing off the internal void and preventing any concrete 34 from flowing into the access box 1. The concrete 34 is poured to form the floor slab, with the concrete poured preferably first into the lid 20 so that the weight of the concrete within the lid 20 will hold down the access box 1 and prevent it from floating out of the wet concrete 34. After the slab has cured and hardened, a separation crack or line will have formed at the joint between the lid rim 21 and the seating rim 14. At this stage, if the floor is not properly level, abrading tools can be used to grind down and level the concrete slab 34 and the access box 1. Because the lid contains approximately two inches of concrete and is securely seated within the main body 10, heavy machinery can be driven over the access box 1 without damaging it. When the service lines 32 are to be installed, the lid 20 is removed from the main body 10 by inserting a pry tool into pry lip 31 and leveraging lid 20 out of its seat. The lid 20 will not be distorted and the concrete within the lid 20 will remain intact, allowing it to be replaced when done. The service lines 32 are now pulled through conduits 33. An opening 35 is cut into plateau 23, the area being covered by no or only a thin layer of concrete, by a drill or other cutting device and the service lines 32 are inserted through this opening. The lid 20 is now positioned back onto seating flange 13. The access void is now fully sealed again, and the final floor covering of tile, carpet, terrazzo, etc. can be applied directly over access box 1. The service lines 32 extending through the access box 1 are now connected to the equipment. If it becomes necessary to repair the service line 32 joints or enter the access void for any other purpose, it is only a matter of removing the floor covering and prying up lid 20 as previously described. When the repairs are finished, the lid 20 is replaced and the floor covering reapplied. By using this invention, destruction of the concrete slab is unnecessary and repouring of a portion of the slab is not required.

The embodiments and examples set forth above are for purposes of illustration, and it is to be understood that the true scope and definition of the invention is to be as set forth in the following claims.

I claim:

1. An access box forming a void in a poured slab comprising:
   (A) a main body having substantially vertical side walls extending upwardly from a bottom, said side walls defining an open upper perimeter on said main body;
   (B) a substantially horizontal seating flange extending outwardly from said side walls at said upper perimeter;
   (C) a flared seating rim extending upwardly and outwardly from said seating flange;
   (D) a removable lid adapted to correspond to said main body, said lid having a lid bottom and a flared lid rim extending upwardly and outwardly from said lid bottom, whereby said lid acts to receive a portion of the poured slab, where said flared lid rim abuts said flared seating rim of said main body, and where a portion of said lid bottom abuts said horizontal seating flange of said main body, whereby said lid and said main body together form an enclosed, internal void;
   (E) a pry lip said pry lip comprising a short segment of said seating rim extending more outwardly from said seating flange than the remainder of said seating rim and a corresponding short segment of said lid rim extending more outwardly from said lid bottom than the remainder of said lid rim; and
   (F) a plateau extending upwardly from said lid bottom, said plateau having a relatively horizontal upper surface.

2. The device of claim 1, further comprising one or more troughs extending downward from said lid bottom.

3. The device of claim 1, further comprising an annular shoulder of substantially right angle configuration positioned between said seating flange and said top walls.

4. The device of claim 1, formed of a polymeric material.

5. The device of claim 1, formed of a polymeric material containing glass fibers.

6. The device of claim 1, where said plateau is positioned adjacent said lid rim.

7. The device of claim 1, where the height of said plateau is substantially equal to the height of said lid rim.

8. The device of claim 1, where said seating rim and said lid rim are angled outwardly approximately 10 degrees from vertical, and said pry lip is angled outwardly approximately 25 degrees from vertical.

9. The device of claim 1, where said side walls are tapered.

10. The device of claim 6, where said plateau is positioned adjacent said side wall opposite from said pry lip.

* * * * *